US008146144B2

(12) United States Patent
Jaenicke

(10) Patent No.: US 8,146,144 B2
(45) Date of Patent: Mar. 27, 2012

(54) METHOD AND SYSTEM FOR THE TRANSPARENT TRANSMISSION OF DATA TRAFFIC BETWEEN DATA PROCESSING DEVICES, CORRESPONDING COMPUTER PROGRAM PRODUCT, AND CORRESPONDING COMPUTER-READABLE STORAGE MEDIUM

(75) Inventor: Lutz Jaenicke, Berlin (DE)

(73) Assignee: Innominate Security Technologies AG, Berlin (DE)

( * ) Notice: Subject to any disclaimer, the term of this patent is extended or adjusted under 35 U.S.C. 154(b) by 902 days.

(21) Appl. No.: 10/544,574

(22) PCT Filed: Feb. 5, 2004

(86) PCT No.: PCT/EP2004/001065
§ 371 (c)(1), (2), (4) Date: Aug. 11, 2006

(87) PCT Pub. No.: WO2004/071047
PCT Pub. Date: Aug. 19, 2004

(65) Prior Publication Data
US 2007/0006292 A1    Jan. 4, 2007

(30) Foreign Application Priority Data
Feb. 6, 2003 (DE) .................................. 103 05 413

(51) Int. Cl.
*G06F 15/16* (2006.01)
(52) U.S. Cl. .............................. 726/11; 726/27; 713/151
(58) Field of Classification Search ........................ None
See application file for complete search history.

(56) References Cited

U.S. PATENT DOCUMENTS

| 5,757,924 | A  | * | 5/1998  | Friedman et al. .............. 713/151 |
| 6,130,892 | A  | * | 10/2000 | Short et al. ..................... 370/401 |
| 6,151,679 | A  | * | 11/2000 | Friedman et al. ................. 726/3 |
| 7,134,012 | B2 | * | 11/2006 | Doyle et al. .................... 713/151 |
| 7,430,759 | B2 | * | 9/2008  | Piepiorra et al. ................ 726/11 |
| 7,715,394 | B2 | * | 5/2010  | Six .............................. 370/392 |

FOREIGN PATENT DOCUMENTS

| DE | 197 40 547 A1   |   | 4/1998  |
| DE | 101 07 883 A1   |   | 8/2002  |
| DE | 202 11 995 U1   | * | 1/2003  |
| DE | 101 38 865 A1   |   | 2/2003  |
| JP | 63-284942       |   | 11/1988 |
| JP | 2000-341328     |   | 12/2000 |
| JP | 2000-354034     |   | 12/2000 |
| WO | WO 02/07384 A1  |   | 1/2002  |

OTHER PUBLICATIONS

Yuhei Iwasaki "How to make LAN in the Intranet era, super introductory of LAN study 6", Computer & Network LAN, vol. 14, No. 10, pp. 62-68, Ohm Corporation (Oct. 1, 1996).
Katsushi Shimamoto et al. "OSI Compliance of Network Products", Toshiba Review, Toshiba Corporation, vol. 46, No. 11, pp. 889-893, (1991).
E. Strother, "Denial of Service Protection The Nozzle", North Carolina State University, pp. 32-41, (Aug. 29, 2000).
W. Weber, "Firewall Basics", Telsiks'99, pp. 300-305, (Oct. 13-15, 1999).
"Firewall in Der Netzwerkkarte", CT Magazin Fuer Computer Technik, Verlag Heinz Heise GmbH., Hannover, DE, No. 25, (Dec. 2, 2002).

* cited by examiner

*Primary Examiner* — Kaveh Abrishamkar
(74) *Attorney, Agent, or Firm* — Norris McLaughlin & Marcus, PA

(57) ABSTRACT

The invention relates to a method and a system for the transparent transmission of data traffic between data processing devices, a corresponding program product, and a corresponding computer-readable storage medium, which can be used especially for transparently inserting, modifying, and/or removing data packets into/in/from the data traffic by introducing a second computer system (serially connected computer system) into the network interface of a main computer and processing the network traffic in the inventive manner. Individual packets and/or connections can be affected in a selective manner or all packets and/or connections can be affected as a whole. An important aspect of the invention lies in the fact that the serially connected computer system transmits data traffic between the main computer and a partner, the serially connected computer imitating the address properties of the main computer in relation to the partner and/or the address properties of the partner in relation to the main computer.

20 Claims, No Drawings

METHOD AND SYSTEM FOR THE TRANSPARENT TRANSMISSION OF DATA TRAFFIC BETWEEN DATA PROCESSING DEVICES, CORRESPONDING COMPUTER PROGRAM PRODUCT, AND CORRESPONDING COMPUTER-READABLE STORAGE MEDIUM

The invention relates to a method and a system for transparent transmission of data traffic between data processing devices, as well as a corresponding computer program product and a corresponding computer-readable storage medium, which can be used, in particular, for transparent insertion, modification and/or removal of data packets from the data traffic. This is accomplished by introducing in the network interface of a main computer a second computer system (intermediate computer system), which processes the network traffic in the manner proposed by the invention. Either individual packets and/or connections, or all packets and/or connections can be affected.

BACKGROUND

Computer systems connected to networks identify themselves to the other communication partners by using addresses. A computer system connected to the Internet, which communicates with other computers via IP (Internet Protocol), uses an IP address for this purpose. If the Ethernet is used as a transport medium, then a MAC address (Media Access Control) is used for the Ethernet packets. Similar addressing schemes apply, for example, to a wireless local area network (WLAN or Wireless LAN).

In addition, incoming and outgoing connections must be unambiguously identified. This is accomplished in the Internet protocol by using so-called "Port" numbers. Respective address and port pairs at each of the transmitter and the receiver define a connection.

The address data, for example the MAC and IP addresses, are defined in part by the hardware (for example the MAC address of network hardware), or must be set at the computer, or are requested from a server at the start of a session by the computer itself (for example DHCP (=Dynamic Host Configuration Protocol) for an IP address).

Processing of data packets and/or connections in the respective environment is described by the OSI layer model (OSI=Open Systems Interconnection) in layers 2 (Data Link Layer) and 3 (Network Layer). Data packets and connections are routed across physical media, whereby the data are transported via a medium as stipulated for the Data Link Layer (for example, Ethernet frames over Ethernet cables). The data exchange between different computers is controlled in the Network Layer, for example by using IP packets.

Layer 2: Bridges and Switches

Data packets are sent from one computer to another computer. The devices in layer 2 may influence the transport of the data packets. These devices are typically bridges and switches, which control the distribution of the data packets to the individual cable connections. Devices of layer 2 transport the data packets without modifying the data packets. No new separate data packets are generated.

The addressing scheme for the data packets in layer 2 depends on the transport medium. In an Ethernet, MAC addresses are used for addressing. The payload, for example an IP packet, is embedded in an Ethernet frame.

Layer 3 Router

Routers evaluate the address information of layer 3, for example the IP addresses. The data packets are transmitted to other routers or to the destination computer based on the addresses and routing information. In this process, new data packets of layer 2 are generated to enable transport of the data over the intermediate lines.

Data packets can be modified in a router by disassembling large data packets to produce several small data packets, which are later reassembled again (fragmentation).

NAT-Router

Routers may optionally modify the IP connection data (address and port) and thus hide the true identity of a computer. This approach is used with NAT (Network Address Translation), which reduces the number of IP addresses that need to be assigned, or can also hide an internal network structure.

VPN-Router

If a VPN (Virtual Private Network) is set up from two remote sub-networks, then the data packets are modified (encrypted) on the intermediate transport path, for example, to prevent unauthorized monitoring. When the data arrive at their destination, their original form is restored. During transport, the data typically appear with the addresses of both VPN routers (ESP protocol, ESP=Encapsulating Security Payload).

Proxy

A proxy receives connections and sets up new connections. This technique is frequently used with firewalls and NAT routers. A proxy has full control over the data flow. "Transparent proxy" arrangements are known, whereby the term "transparent" is used to indicate that no special proxy protocol is employed. Instead, the data flow is intercepted and processed on the proxy computer without the awareness of the client computer.

SUMMARY

It is an object of the invention to provide a method and a system for transparent transmission of data traffic between data processing devices, as well as a corresponding computer program product and a corresponding computer-readable storage medium, which obviates the aforedescribed disadvantages and more particularly reduces the complexity of the system administration.

According to a particular advantage of the method for transparent transmission of data traffic between data processing devices, services which themselves are not supported by the data processing devices, can be transparently implemented by introducing a computer system (intermediate processor) in the link used for data transmission between a first data processing device and a second data processing device or communication device (distant station), wherein the computer system transmits the data traffic between the first data processing device and the distant station by imitating to the distant station the address properties of the first data processing device and/or to the first data processing device the address properties of the distant station.

A system for transparent transmission of data traffic between data processing devices advantageously includes at least one chip and/or processor, which is (are) configured to execute a process for transparent transmission of the data traffic between data processing devices, wherein the transmission includes the method steps set out below.

A computer program product for transparent transmission of data traffic between data processing devices includes a computer-readable storage medium storing a program which, after being loaded into the memory of a computer, enables the computer to execute a process for transparent transmission of data traffic between data processing devices, wherein the transmission includes the method steps set out below.

Data traffic can advantageously be transmitted transparently between data processing devices by employing a computer-readable storage medium storing a program which, after being loaded into the memory of a computer, enables the computer to execute a process for transparent transmission of data traffic between data processing devices, wherein the transmission includes the method steps set out below.

According to an advantageous embodiment of the method of the invention, the transmission of the data traffic may include monitoring the data traffic, protecting the data traffic against viruses and/or modifying, such as encrypting and decrypting, data and/or data packets, as well as adding and/or removing data and/or data packets. Advantageously, the transmission of the data traffic can be controlled by a set of rules implemented on the intermediate processor. According to another advantageous embodiment, the intermediate processor may operate as a transparent firewall and/or a transparent proxy system.

According to another advantageous embodiment of the invention, the intermediate processor may receive connections, which are addressed to the first data processing device. In a particular advantageous embodiment, the intermediate processor, rather than the first data processing device, executes those functions, which the first data processing device does not provide at all or does not fully provide, by imitating the address of the first data processing device.

Advantageously, the intermediate processor can also set up connections independent of the first data processing device, if the intermediate processor has its own, separate address for directly contacting the intermediate processor. The separate address can also be used to operate and/or administer the intermediate processor. The intermediate processor can automatically set up the connection using the separate address of the intermediate processor. Alternatively, the intermediate processor can use the address of the first data processing device.

Advantageously, the computer system may also operate as intermediate processor for a plurality of first data processing devices. The computer system hereby processes and/or transmits the connections of the individual first data processing devices by imitating for each connection the address data of a corresponding connected first data processing device.

Depending on the particular application of the invention, the intermediate processor can automatically obtain the address properties of the first data processing device(s) from the data to be transmitted, or can alternatively use predefined address data for imitating the first data processing device(s). In another advantageous embodiment, the intermediate processor can be controlled by the first the data processing device. Alternatively, the system can be set up so that the first data processing device cannot influence the operation of the intermediate processor.

According to another advantage of the invention, the data exchange between different terminals can be transmitted transparently. For example, the first data processing device can be implemented as a PC, a notebook, an embedded computer system, or a handheld PC, such as a Palmtop or a Personal Digital Assistant (PDA). Likewise, the distant station can be implemented as a PC, a notebook, an embedded computer system, a handheld PC, such as a Palmtop or a Personal Digital Assistant (PDA), or a telephone or a radio-telephone. Use of the invention as an embedded computer system is of particular interest, because other embedded systems can be optimally enhanced in this way. Because embedded systems, which are used, for example, for controlling machines, in the automobile industry, in ticket vending machines and/or in household appliances, typically incorporate only a limited functionality, the required security functions can now advantageously be added by the intermediate computer system of the invention.

Depending on the particular requirements, the data transmission links can be in the form of cable connections and/or wireless connections, but can also be in the form of a data network and/or communication network, such as an intranet or the Internet.

With the invention, the communication of the computer can be freely controlled without requiring modifications on the computer or the communication partner. For example, security functions can be implemented, which would otherwise not be supported without modifying the computer system. For example, a VPN (Virtual Private Network, for example IPSec) is not available for all operating systems or computers.

DETAILED DESCRIPTION OF THE INVENTION

The invention will now be described with reference to an exemplary additional computer system (intermediate computer system), which is introduced in the network interface of a main computer. The intermediate computer system processes the network traffic and transparently inserts new data packets and/or processes data packets in transit and/or removes data packets. This can apply either selectively to individual packets and/or connections, or to all packets and/or connections. The selection and the manner in which the packets are processed are determined by a set of rules on the intermediate computer system. For example, the packets can be processed by viewing and treating the corresponding packets and/or connections as local packets and/or connections of the second computer system. The introduced intermediate computer system is then transparent for the corresponding main computer and the communication partners.

Transparency

Hardware, which is introduced into networks in a transparent manner, includes for example bridges and switches, as opposed to routers. These components control the data transport, so that for example data packets are only transmitted to those sections of the network where they are needed. This reduces the load on the network. Moreover, methods for restricting access based on addresses (MAC, IP, others) or connection properties can be implemented. A packet which is allowed to pass through is transported without being modified. Bridges or switches therefore appear to be transparent.

A VPN can be optionally implemented by using a router with VPN functionality. A router subdivides networks into sub-networks. The (IP-) addresses must be changed when a router is introduced. A router is therefore not transparent, which increases the complexity for system administration.

This problem is solved by the proposed novel intermediate computer system. The intermediate computer system receives the packets from the main computer and processes the packets, for example through encryption. The intermediate computer then transmits the processed data packets onward, whereby the intermediate computer imitates the address data, for example the IP address and MAC address, of the main computer. Likewise, the intermediate computer processes (for example decrypts) the received data packets and transmits them to the main computer. The intermediate computer assumes the parameters of the incoming connection. Because the addresses are imitated, the remaining network components need not be reconfigured: the process is transparent to the other participating computers.

The inventive concept does not require that each data packet transmitted from or to the main computer has a corresponding packet in the rest of the network, since additional packets may be generated (for example, handshake) or removed. A proxy can also be used.

Depending on the particular requirements or the application of the intermediate computer, the intermediate computer may obtain the address information for the imitated connections from data packets of the main computer(s), and/or may use information provided by a system administrator.

The concept of the proposed transparent intermediate computer can be extended to other areas in addition to encryption.

The intermediate computer can also block connections from or to the main computer based on defined rules, i.e., can function as a transparent firewall.

The intermediate computer can also be configured to receive connections addressed to the main computer. In this way, services can be implemented which the main computer itself does not support. For example, an administrative functionality based, for example, on SNMP (Simple Network Management Protocol) can be implemented to enable remote diagnostics. The intermediate computer receives the connection and provides independent diagnostic and administrative functionality, which the main computer does not provide at all or does not provide to the same extent (or should not provide publicly).

In another embodiment, the intermediate computer can also operate to set up connections independently, i.e., independent of the main computer, for example to receive configuration data or to send status messages.

The intermediate computer can also be configured to assume monitoring functions by transmitting attempted or completed connections to a central station (for example for an Intrusion Detection System).

Processing of the Data/data Packets of the Data Traffic

Transmission of data traffic may require processing of data or data packets, whereby data packets of any type may be processed. For example, a PPPoE connection (Point-to-Point Protocol over Ethernet) is frequently used for DSL connections (DSL=Digital Subscriber Line). The IP packets are here embedded in PPPoE packets, which are in turn transported as Ethernet packets. The intermediate computer can, for example, remove the PPPoE envelope and apply processing rules (firewall, VPN, virus protection) to the embedded packets. The processed (for example encrypted) packets can then again be embedded in the PPPoE envelope and transported onward.

Use of the Intermediate Computer for Several Main Computers

According to another major application of the computer system of the invention, the intermediate computer can be configured to serve the connections of several main computers. For example, additional functions can be provided for all main computers, such as VPN. The intermediate computer hereby imitates the address properties of the respective main computers. The main computers then appear be independent from one another to the rest of the network.

Separate Addressability

According to another embodiment of the invention, the intermediate computer can have its own dedicated addresses. The intermediate computer can be reached independent of the main computer. The intermediate computer can then be operated and administered by, for example, configuring the properties of the intermediate computer, so that the intermediate computer can manage the transparent connections of the main computers.

Implementation

The intermediate computer is an independent computer with a processor, a program memory and a data storage device, as well as interfaces for data communication. The intermediate computer can be configured so that it can be automatically controlled from the main computer. In a particular version with enhanced security features, the intermediate computer operates entirely independent of the main computer.

Interfaces

The interfaces served by the intermediate computer may be Ethernet interfaces, but can also be serial interfaces, bus systems such as PCI, PCMCIA, and the like. The intermediate computer can be installed at any location where network data are transported. In this way, the intermediate computer can be implemented as a separate device as well as an assembly or as a chip suitable for installation in another computer.

The intermediate computer system of the invention can be miniaturized, for example adapted to the requirements of mobile main computers, by implementing the intermediate computer, for example, as an "Embedded System", as a single-board computer or as a computer on a chip. According to a particular embodiment, the intermediate computer can also be implemented as a special network card in a main computer. In alternative embodiments, the intermediate computer can be introduced in an Ethernet connection, installed in a modem, and/or integrated in the network cable.

The invention is not limited to the aforedescribed embodiments. Instead, additional embodiments and modifications can be realized by combining and modifying the aforedescribed means and features, without deviating from the scope of the invention.

The invention claimed is:

1. A method for transparent transmission of data traffic between data processing devices, the method comprising:
   providing a computer system in a connection for data transmission between a first data processing device and a second data processing device, wherein the second data processing device is remote with respect to the first data processing device, and
   transmitting the data traffic between the first data processing device and the second data processing device via the computer system, the computer system performing at least one of (a) transmitting first imitated address data, comprising Media Access Control address properties of the first data processing device, to the second data processing device and (b) transmitting second imitated address data, comprising Media Access Control address properties of the second data processing device, to the first data processing device.

2. The method according to claim 1, wherein the step of transmitting the data traffic further comprises:
   monitoring the data traffic,
   protecting against a virus, or
   modifying data or data packets by encrypting or decrypting the data or data packets or by adding or removing the data or data packets.

3. The method according to claim 1, wherein the computer system receives connections addressed to the first data processing device.

4. The method according to claim 1, wherein the computer system, rather than the first data processing device, executes the one or more functions by imitating the Media Access Control address properties of the first data processing device, wherein the one or more functions executed by the computer system are not provided or not provided in full by the first data processing device.

5. The method according to claim 1, wherein the computer system serves as an intermediate processor for several first data processing devices and processes or transmits connections of individual first data processing devices by imitating address data of an individual first data processing device for each connection.

6. The method according to claim 1, wherein the computer system has its own address for directly contacting the computer system.

7. The method according to claim 6, wherein the computer system is served or administered via a separate address.

8. The method according to claim 6, wherein the computer system independently sets up connections by using its own address or by using an address of the first data processing device, independent of the first data processing device.

9. The method according to claim 1, wherein the computer system obtains the Media Access Control address properties of the first data processing device automatically from data to be transmitted, or uses predefined address data for imitating the first data processing device.

10. The method according to claim 1, wherein the computer system is controlled by the first data processing device.

11. The method according to claim 1, wherein the function of the computer system cannot be influenced by the first data processing device.

12. A system with at least one chip or processor comprising:
means for transparent transmission of data traffic between a first data processing device and a second data processing device, wherein the means for transparent transmission comprises:
means for providing a computer system in a connection for data transmission between the first data processing device and the second data processing device, wherein the second data processing device is remote with respect to the first data processing device, and
means for transmitting the data traffic between the first data processing device and the second data processing device via the computer system, the computer system is configured to perform at least one of (a) transmitting first imitated address data, comprising Media Access Control address properties of the first data processing device, to the second data processing device and (b) transmitting second imitated address data, comprising Media Access Control address properties of the second data processing device, to the first data processing device.

13. The system according to claim 12, wherein the system is implemented as a firewall, or a transparent proxy system.

14. The system according to claim 12, wherein the system is implemented as
an embedded system,
a single-board computer, or
a system-on-a-chip.

15. The system according to claim 12, wherein the system is integrated in
a network card,
an Ethernet connection,
a modem, or
a data transmission cable.

16. The system according to claim 12, wherein the system further comprises
one or several Ethernet interfaces,
one or several serial interfaces, or
one or several bus systems.

17. The system according to claim 12, wherein the system can be contacted via a separate address.

18. A non-transitory computer program product encoded on a computer-readable storage medium, wherein the computer program product comprises:
a stored program which, after being loaded into the memory of a computer, enables the computer to provide means for transparent transmission of data traffic between a first data processing device and a second data processing device, wherein the means for transparent transmission comprises:
means for providing a computer system in the connection for data transmission between the first data processing device and the second data processing device, wherein the second data processing device is remote with respect to the first data processing device; and
means for transmitting the data traffic between the first data processing device and the second data processing device via the computer system, the computer system is configured to perform at least one of (a) transmitting first imitated address data, comprising Media Access Control address properties of the first data processing device, to the second data processing device and (b) transmitting second imitated address data, comprising Media Access Control address properties of the second data processing device, to the first data processing device.

19. A non-transitory computer-readable storage medium storing a program which, after being loaded into a memory of a computer, enables the computer to provide means for transparent transmission of data traffic between a first data processing device and a second data processing device, wherein the means for transparent transmission comprises:
means for providing a computer system in the connection for data transmission between the first data processing device and the second data processing device, wherein the second data processing device is remote with respect to the first data processing device; and
means for transmitting the data traffic between the first data processing device and the second data processing device via the computer system, the computer system is configured to perform at least one of (a) transmitting first imitated address data, comprising Media Access Control address properties of the first data processing device, to the second data processing device and (b) transmitting second imitated address data, comprising Media Access Control address properties of the second data processing device, to the first data processing device.

20. A device for transparent transmission of data traffic between a first data processing device and a second data processing device, the device for transparent transmission being insertable into a connection for data transmission between the first data processing device and the second data processing device and comprising:
means for transmitting the data traffic between the first data processing device and the second data processing device via the device for transparent transmission, the means is configured to perform at least one of transmitting first imitated address data, comprising Media Access Control address properties of the first data processing device, to the second data processing device and transmitting second imitated address data, comprising Media Access Control address properties of the second data processing device, to the first data processing device.

* * * * *